United States Patent [19]
Yoda

[11] Patent Number: 4,750,159
[45] Date of Patent: Jun. 7, 1988

[54] APPARATUS FOR GENERATING MAGNETIC FIELD IN A MAGNETO-OPTIC RECORDING/REPRODUCING SYSTEM

[75] Inventor: Yoshiro Yoda, Tokyo, Japan

[73] Assignee: Olympus Optical Co., Ltd., Tokyo, Japan

[21] Appl. No.: 912,379

[22] Filed: Sep. 26, 1986

[30] Foreign Application Priority Data

Oct. 2, 1985 [JP] Japan .................. 60-219649

[51] Int. Cl.$^4$ .............. G11B 11/12; G11B 13/04
[52] U.S. Cl. .................. 369/13; 360/59; 360/114; 365/122
[58] Field of Search ........ 369/13; 360/59, 114; 365/122

[56] References Cited

U.S. PATENT DOCUMENTS 4,539,662  9/1985  Hatano et al. .......... 360/114
4,610,009  9/1986  Connell ............... 369/13

FOREIGN PATENT DOCUMENTS 57-40761  3/1982  Japan .
59-119507  7/1984  Japan ............... 360/114

Primary Examiner—Raymond F. Cardillo
Assistant Examiner—Hoa T. Nguyen
Attorney, Agent, or Firm—Frishauf, Holtz, Goodman & Woodward

[57] ABSTRACT

In an apparatus for generating a magnetic field, first and second electromagnetic coils are linearly arranged on a yoke. The coils face one surface of an optical disk. An optical head is positioned above the other surface of the optical disk. A track address for denoting a track on the optical disk is picked up from the optical disk by the optical head and an information signal processor. A first and/or second energizing signal is generated from a switching circuit in accordance with the track address. Thus, one or both of coil drive circuits are driven in response to the energizing signals, energizing one or both of the coils, so that a predetermined magnetic field is applied to the optical disk from the selected coil or coils.

5 Claims, 5 Drawing Sheets

F I G. 8
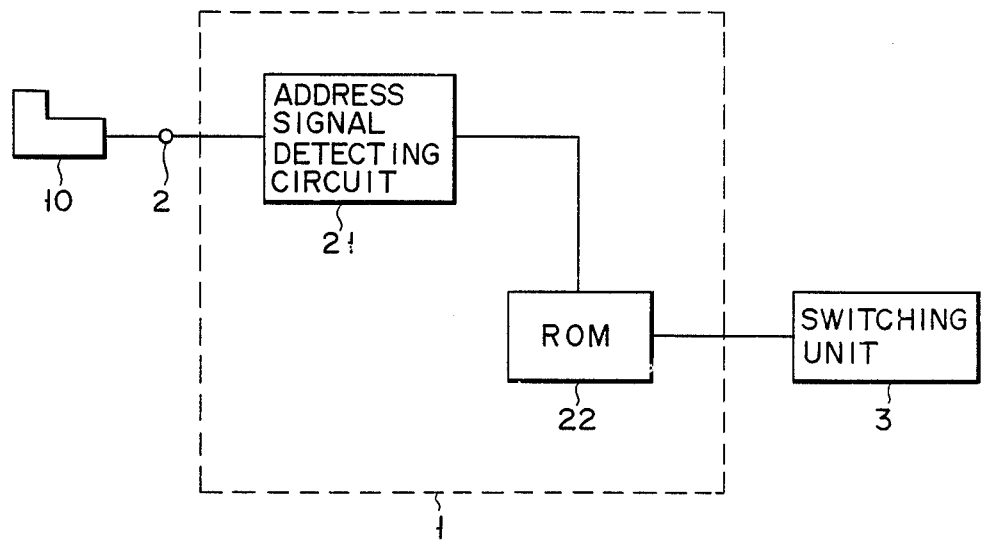
F I G. 9
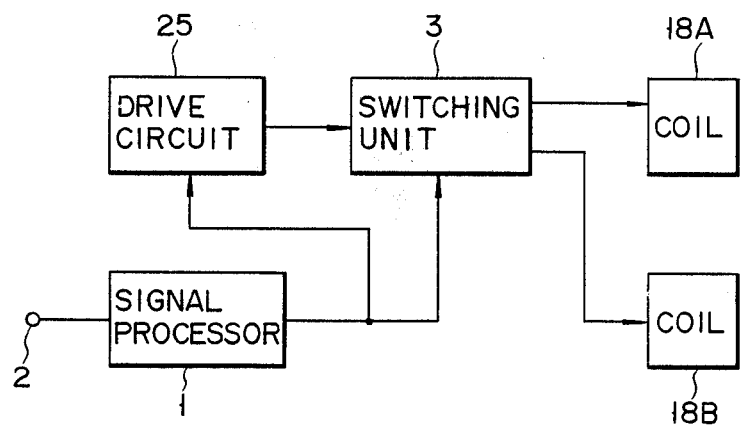

APPARATUS FOR GENERATING MAGNETIC FIELD IN A MAGNETO-OPTIC RECORDING/REPRODUCING SYSTEM

BACKGROUND OF THE INVENTION

The present invention relates to an apparatus for generating a magnetic field in a magnetooptic recording/reproducing system utilizing a magnetooptic effect and, more particularly, to an apparatus for generating a magnetic field for applying a magnetic field to an information recording medium to record or erase the information in a magnetooptic recording/reproducing system for recording or erasing the information on the medium by utilizing a magnetooptic effect.

In a magnetooptic recording/reproducing system utilizing a magnetooptic effect, a laser beam is converged onto an information recording medium (hereinafter referred to as "an optical disk") and a magnetic field is applied to a region on the optical disk irradiated with the laser beam in a recording or erasing mode. Therefore, the magnetooptic recording/reproducing system has an apparatus for generating a magnetic field for applying a magnetic field to the optical disk. A conventinal apparatus for generating a magnetic field is disclosed in Japanese Patent Laid-open Publication No. 119507/1984. The apparatus disclosed in this Publication has a magnetic yoke comprising a pair of bar sections and a base section on which the bar sections are formed, and the magnetic yoke has a length equal to the width of a region scanned with a laser beam in a radial direction of the optical disk. As shown in FIG. 1, in a magnetooptic recording/reproducing system, optical head 11 is disposed above one side surface of optical disk 10, and magnetic unit 13 is disposed under the surface of disk 10. In case of accessing a predetermined track on disk 10, head 11 is moved in the radial direction R of disk 10, as shown in FIG. 1 to record information on a desired track, to reproduce information from a desired track or to erase information recorded on a desired track. In a recording and reproducing mode, a vertical magnetic field is applied from unit 13 to disk 10. Unit 13 has bar sections 14B and 14C formed on base section 14A and an exciting coil 15 wound around one section 14B of magnetic yoke 14 which has a length equal to a width of a region to be scanned with a laser beam in a radial direction of disk 10.

Since a vertical magnetic field is applied to the entire region to be scanned with the laser beam in the radial direction of the optical disk by such magnetic unit 13, coil 15 increases in size and consumes a large amount of power and exciting coil 15 and its driving circuit generates a relatively large heat emission, thereby resulting in a high cost system. Since the vertical magnetic field is applied to not only the area irradiated with the laser beam but the other areas irradiated with no laser beam, another drawback arises that the efficiency of the magnetic field to be applied to the beam irradiated area per exciting power is wrong.

A magnetic unit for solving the above-mentioned drawbacks is disclosed in Japanese Patent Laid-open Publication No. 40761/1982. This magnetic unit 13 has, as shown in FIG. 3, one base section 14A having a length equal to a width to be scanned with a laser beam in a radial direction of an optical disk and a bar section 14B formed on the base section 14A, two segments 17A, 17B separated from each other and arranged along bar section on base section 14A, and exciting coils 18A, 18B respectively wound around divided segments 17A, 17B. A vertical magnetic field Hy having a level Hc or higher as shown in FIG. 4 is applied onto optical disk 10 by unit 13 in recording or erasing mode. In FIG. 4, when applying a vertical magnetic field $H_1$ to first region $Z_1$ of disk 10, first coil 18A is selected and merely excited. When applying a vertical magnetic field to second region $Z_2$ of disk 10, second coil 18B is selected and merely excited. When applying a vertical magnetic field $H_3$ to third region $Z_3$ between regions $Z_1$ and $Z_2$, one of coils 18A and 18B is selected and energized.

In unit 13 shown in FIG. 3, there arise drawbacks that a leakage magnetic flux occurs between segments 17A and 17B of yoke 14 as shown in FIG. 5 and intensity Hy of the vertical magnetic field decreases to level Hc or lower at the ends of regions $Z_1$ and $Z_2$ as shown in FIG. 4. As a result, intensity Hc of a magnetic field sufficient to record or erase information is not applied to a boundary region on disk 10 facing a space region between segments 17A and 17B, and information may not be stably recorded nor reliably erased. In order to solve this problem, it is considered that a relatively large current should always be supplied to the selected coil to generate a vertical magnetic field having sufficient intensity Hc. Since a large current must be supplied to the coil, the result is a large amount of heat generated in the coil and large power consumption.

SUMMARY OF THE INVENTION

An object of the present invention is to provide an apparatus for generating a magnetic field which can generate a magnetic field having sufficient intensity to all regions to be scanned with a light beam on an information recording medium with low power consumption and low heat in high utility efficiency of the magnetic field.

According to one aspect of the present invention, there is provided an apparatus for applying a magnetic field to an information recording medium and recording information comprising:

a magnetic unit having at least first and second electromagnetic coils linearly arranged and separated by a gap region from each other and disposed oppositely to the recording medium, and means for selectively energizing the first and second coils in accordance with a region on the medium irradiated with a light beam, the first coil being energized to generate a first magnetic field having a first predetermined intensity, when a first region on the medium opposed to the first coil is irradiated with the light beam, the second coil being energized to generate a second magnetic field having a second predetermined intensity, when a second region on the medium opposed to the second coil is irradiated with the light beam, and the first and second coils being energized to generate a third magnetic field having a third predetermined intensity when a region on the medium opposed to a gap region between the first and second coils is irradiated with the light beam.

According to another aspect of the present invention, there is provided an apparatus for applying a magnetic field to an information recording medium and recording information comprising:

a magnetic unit having at least first and second electromagnetic coils linearly arranged and separated through a gap region from each other and disposed oppositely to the recording medium, and means for selectively energizing the first and second coils in accordance with a region on the medium irradiated with a light beam, the first coil being energized to generate a first magnetic field having a first predetermined intensity, when a first region on the medium opposed to the first coil is irradiated with the light beam, the second coil being energized to generate a second magnetic field having a second predetermined intensity, when a second region on the medium opposed to the second coil is irradiated with the light beam, and one of the first and second coils being energized to generate a third magnetic field having a third predetermined intensity larger than the intensity of the first and second magnetic fields when a region on the medium opposed to a gap region between the first and second coils is irradiated with the light beam.

BRIEF DESCRIPTION OF THE DRAWINGS

FIG. 8 is a block diagram showing an embodiment of a signal processor shown in FIG. 6;

FIG. 9 is a circuit block diagram of an apparatus for generating a magnetic field according to another embodiment of the present invention applied to the magnetic unit shown in FIG. 3.

DETAILED DESCRIPTION OF THE PREFERRED EMBODIMENTS

Figure 3:
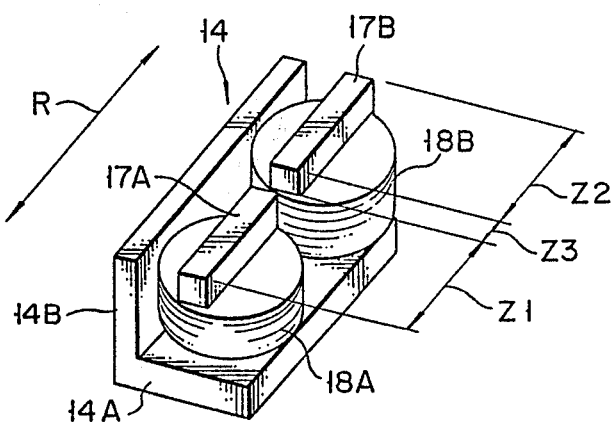
FIG. 3 is a perspective view showing a conventional magnetic unit different from the type shown in FIG. 2.
Figure 4:
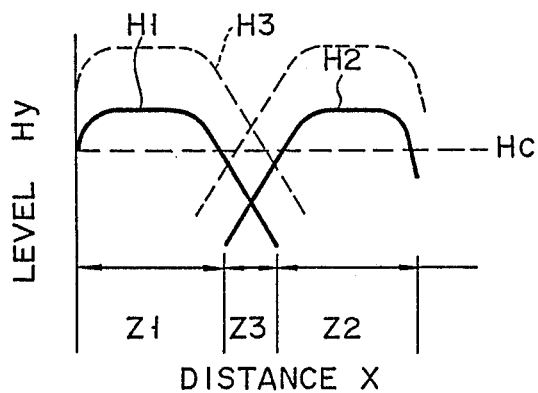
FIG. 4 is a graph showing the intensity distribution of a magnetic field generated from the magnetic unit shown in FIG. 3.
Figure 5:
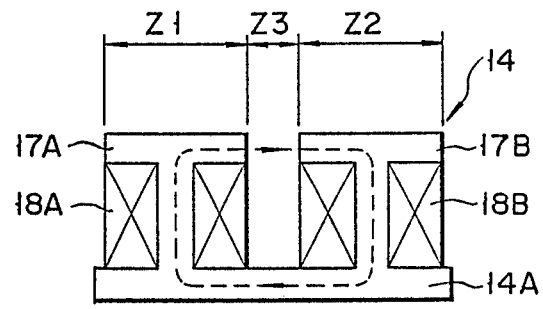
FIG. 5 is a cross sectional view of the magnetic unit shown in FIG. 3.
Figure 6:
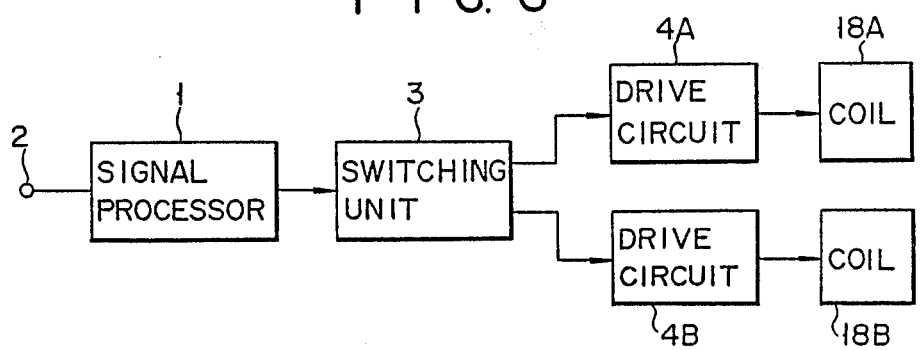
FIG. 6 is a circuit block diagram of an apparatus for generating a magnetic field according to an embodiment of the present invention applied to the magnetic unit in FIG. 3.

An embodiment of an apparatus having a magnetic unit for generating a magnetic field of the present invention will be described with reference to FIGS. 6 to 10. FIG. 6 shows a block diagram of a circuit for energizing a magnetic unit. The magnetic unit is similar to the conventional unit shown in FIG. 3 and no description is made here in this magnetic unit.

Figure 1:
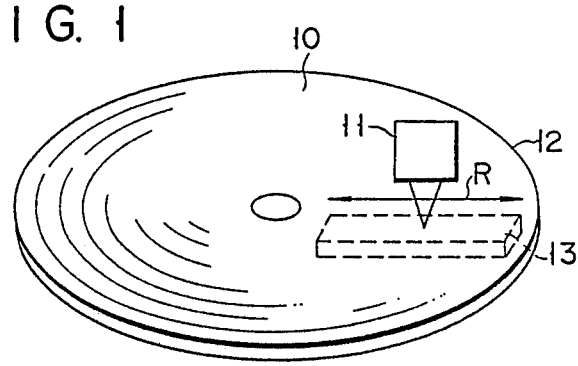
FIG. 1 is a schematic perspective view showing a conventional magnetooptical disk system.
Figure 2:
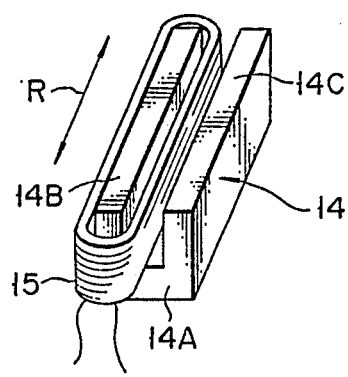
FIG. 2 is a perspective view showing a conventional magnetic unit shown in FIG. 1.

In FIG. 6, an information signal detected by optical head 11 as shown in FIG. 1 is input through terminal 2 to signal processor 1. Processor 1 processes the input signal and outputs a track address signal contained in the information signal and designating a track of optical disk 10 which is scanned with a laser beam emitted from head 11. Processor 1 generates a switching signal in response to the address signal and the switching signal is supplied to switching unit 3, which can generate first and second energizing signals in response to the switching signal to coil drive circuits 4A and 4B. When the first and second signals are supplied to coil drive circuits 4A and 4B, respectively, the coil drive circuits 4A and 4B supply currents to coils 18A and 18B of magnetic unit 14 to generate a vertical magnetic field to disk 10. In other words, coil drive circuits 4A and 4B are energized in accordance with a region of disk 10 onto which the laser beam is irradiated, and coils 18A and 18B of unit 14 corresponding to energized coil drive circuits 4A and 4B generate a vertical magnetic field.

Figure 7A:
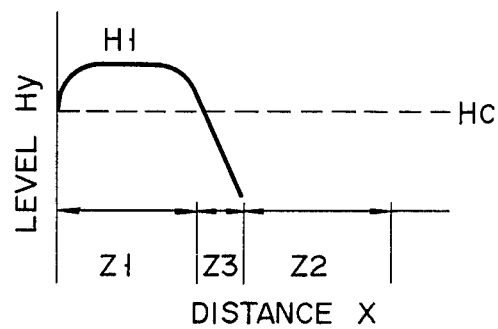
FIGS. 7A to 7C are graphs showing the magnetic field distribution generated from the magnetic unit shown in FIG. 3 energized by the circuit shown in FIG. 6.
Figure 7B:
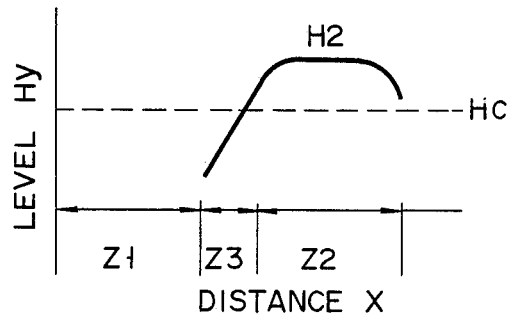
Figure 7C:
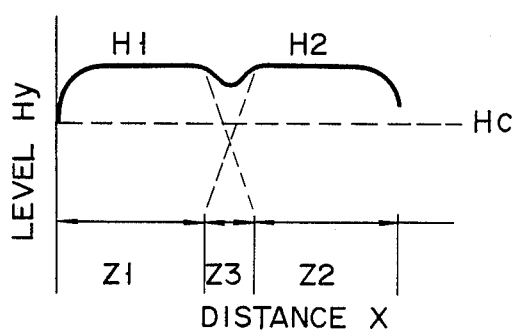

The operation of the circuit in FIG. 6 will now be described in detail. When a disk region $Z_1$ is scanned with the laser beam and the track address signal designating the disk region $Z_1$ is generated from processor 1, processor 1 generates a first switching signal to switching unit 3. Unit 3 generates a first energizing signal to drive circuit 4A to energize drive circuit 4A. Drive circuit 4A supplied with the first energizing signal supplies an exciting current to coil 18A of unit 14 which generates a first vertical magnetic field $H_1$ applied to optical disk 10 and having a magnetic intensity distribution as shown in FIG. 9A. When a disk region $Z_2$ is scanned with the laser beam and the address signal designating the disk region $Z_2$ is generated from processor 1, processor 1 generates a second switching signal. Unit 3 generates a second energizing signal to drive circuit 4B to energize drive circuit 4B. Coil drive circuit 4B supplied with the second energizing signal supplies an exciting current to coil 18B of unit 14, which generates a second vertical magnetic field $H_2$ applied to optical disk 10 and having an intensity distribution as shown in FIG. 7B. Further, a disk region $Z_3$ corresponding to a region between bar section segments 17A and 17B is scanned with the laser beam and a track address signal designating the disk region Z3 is generated from processor 1, processor 1 generates a third switching signal to switching unit 3. Unit 3 generates first and second energizing signals to drive circuits 4A and 4B to energize drive circuits 4A and 4B. Drive circuits 4A and 4B supplied with the first and second signals supply exciting currents to coils 18A and 18B of unit 14, which generate a third vertical magnetic field $(H_1+H_2)$ applied to optical disk 10 and having an intensity distribution as shown in FIG. 7C. In other words, a magnetic field which is the sum of first and second vertical magnetic fields is applied to disk region $Z_3$ facing the space region between segments 17A and 17B.

Since the corresponding coil is energized in accordance with the region irradiated with the laser beam as described above, the apparatus for generating a magnetic field can operate with low power consumption, can reduce the heat generated from the coils, and can apply a magnetic field having sufficient intensity for all regions scanned with the light beam on the information recording medium.

Signal processor 1 in FIG. 6 may be designed, for example, in an arrangement as shown in FIG. 8. In processor 1, address signal detecting circuit 21 detects an address signal from the input signal supplied from head 10, and supplies the signal to ROM 22, which outputs a switching signal stored in the ROM in accordance with the address signal to switching unit 3, which thus selects either the first or second coil or both. As a result, the selected coil is energized.

Figure 10A:
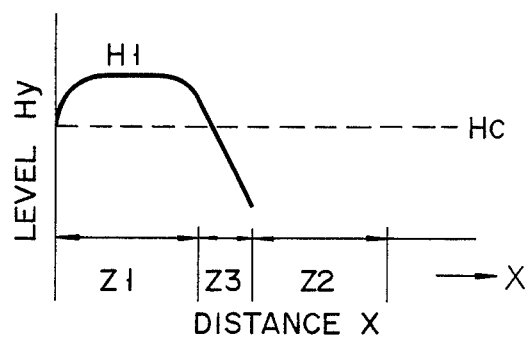
FIGS. 10A to 10C are graphs showing the magnetic field distribution generated from the unit shown in FIG. 3 energized by the circuit shown in FIG. 9.
Figure 10B:
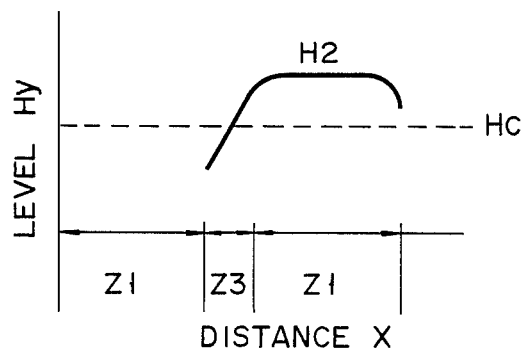
Figure 10C:
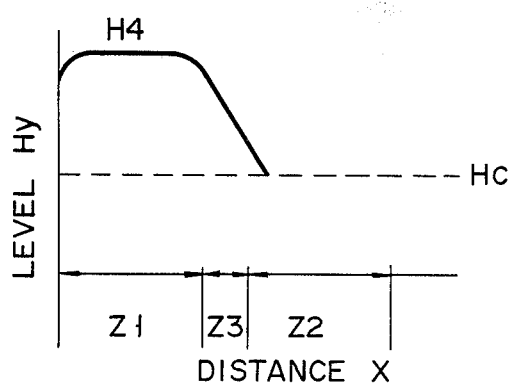

FIG. 9 is a block diagram showing an apparatus for generating a magnetic field according to another embodiment of the present invention. In FIG. 9, signal processor 1 is connected directly to switching unit signal generator 3, and connected through a drive circuit 25 to switching unit 3. In the circuit in FIG. 9, when a first region $Z_1$ is scanned with a laser beam and the track address signal is generated from processor 1, driving circuit 25 is connected through switching unit 3 to first coil 18A in response to a first switching signal generated from processor 1, and driving circuit 25 generates a first energizing signal. This signal is supplied to coil 18A, which generates a first vertical magnetic field H1 as shown in FIG. 10A to light disk 10 from magnetic unit 14. When a second region Z2 is scanned with the laser beam and the track address signal is generated from processor 1, drive circuit 25 is connected through switching unit 3 to second coil 18B in response to a second switching signal generated from processor 1, and driving circuit 25 generates a second energizing signal having a level substantially equal to that of the first energizing signal. This second energizing signal is supplied to coil 18B, which generates a second vertical magnetic field $H_2$ as shown in FIG. 10B to disk 10 from unit 14. Further, when a region Z3 facing a gap region between bar segments 17A and 17B is scanned with the laser beam the track address signal is produced from processor 1, driving circuit 25 is connected to first coil 18A through switching unit 3 in response to a third signal generated from the processor 1, and driving circuit 25 generates a third energizing signal having a level larger than the first energizing signal. This third energizing signal is supplied to coil 18A of magnetic unit 14, which generates a third verticalmagnetic field $H_4$ having an intensity larger than the first vertical magnetic field $H_1$ as shown in FIG. 10C. In other words, the third magnetic field $H_4$ having a large intensity is applied only to third region $Z_3$ corresponding to the gap region between segments 17A and 17B.

The circuit of FIG. 9 is simplified as compared with that of FIG. 6.

In the embodiments described above, a magnetic unit having a pair of coils has been described. However, the present invention is not limited to the particular embodiments described above. For example, a magnetic unit having a plurality of coils, not limited to a pair of coils, may be applied to the present invention.

What is claimed is:

1. An apparatus for applying a magnetic field to an information recording medium and recording information, comprising:
    a magnetic unit having at least first and second electromagnetic coils linearly arranged and separated by a gap region from each other and disposed oppositely to the recording medium, and
    means for selectively energizing the first and second coils in accordance with a region on the medium irradiated with a light beam, the first coil being energized to generate a first magnetic field having a first predetermined intensity, when a first region on the medium opposed to the first coil is irradiated with the light beam, the second coil being energized to generate a second magnetic field having a second predetermined intensity, when a second region on the medium opposed to the second coil is irradiated with the light beam, and the first and second coils being energized to generate a third magnetic field having a third predetermined intensity when a region on the medium opposed to a gap region between the first and second coils is irradiated with the light beam.

2. An apparatus according to claim 1, further comprising:
    means for emitting a light beam toward an information recording medium and for detecting the reflected light beam to thereby convert the detected beam into a detection signal;
    said means for selectively energizing including means for producing position information of a region on the medium irradiated with the beam from the detection signal, and means for selectively energizing said first and second electromagnetic coils in response to the produced position information.

3. An apparatus for applying a magnetic field to an information recording medium and recording information, comprising:
    a magnetic unit having at least first and second electromagnetic coils linearly arranged and separated by a gap region from each other and disposed oppositely to the recording medium, and
    means for selectively energizing the first and second coils in accordance with a region on the medium irradiated with a light beam, the first coil being energized to generate a first magnetic field having a first predetermined intensity, when a first region on the medium opposed to the first coil is irradiated with the light beam, the second coil being energized to generate a second magnetic field having a second predetermined intensity, when a second region on the medium opposed to the second coil is irradiated with the light beam, and one of the first and second coils being energized to generate a third magnetic field having a third predetermined intensity larger than the intensity of the first and second magnetic fields when a region on the medium opposed to a gap region between the first and second coils is irradiated with the light beam.

4. An apparatus accordign to claim 3, further comprising:
    means for emitting a light beam toward an information recording medium and for detecting the reflected light beam to thereby convert the detected beam into a detection signal;
    said means for selectively energizing including means for producing position information of a region on the medium irradiated with the beam from the detection signal, and means for selectively energizing said first and second electromagnetic coils in response to the produced position information.

5. An apparatus according to claim 2, wherein said means for selectively energizing includes:
    a drive source for said electromagnetic coils, and switching means for selectively connecting said first and second electromagnetic coils to the drive source in response to the produced position information.

* * * * *